(12) United States Patent
Kuo et al.

(10) Patent No.: US 12,443,065 B2
(45) Date of Patent: Oct. 14, 2025

(54) DISPLAY APPARATUS

(71) Applicant: Coretronic Corporation, Hsin-Chu (TW)

(72) Inventors: Chih-Hsuan Kuo, Hsin-Chu (TW); Ming-Hsiung Fan, Hsin-Chu (TW); Yi-Cheng Lin, Hsin-Chu (TW); Chin-Lung Chen, Hsin-Chu (TW); Cheng-Wei Zhu, Hsin-Chu (TW); Chin-Yuan Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/527,358

(22) Filed: Dec. 3, 2023

(65) Prior Publication Data
US 2024/0192538 A1     Jun. 13, 2024

(30) Foreign Application Priority Data

Dec. 7, 2022   (CN) .......................... 202223270554.2

(51) Int. Cl.
*G02F 1/1333*     (2006.01)
*G02F 1/1347*     (2006.01)

(52) U.S. Cl.
CPC ........ *G02F 1/13338* (2013.01); *G02F 1/1347* (2013.01)

(58) Field of Classification Search
CPC ........................... G02F 1/13338; G02F 1/1347
See application file for complete search history.

(56) References Cited

U.S. PATENT DOCUMENTS

| 5,877,829 | A  | * | 3/1999  | Okamoto | G02F 1/1334 349/110 |
| 7,453,429 | B2 | * | 11/2008 | Chang | G09G 3/3648 345/89 |
| 9,690,110 | B2 | * | 6/2017  | Drolet | H04N 13/302 |
| 10,678,077 | B2 | * | 6/2020 | Fang | G02F 1/1323 |
| 10,782,545 | B2 | * | 9/2020 | Smith | G02F 1/133603 |
| 10,802,356 | B2 | * | 10/2020 | Harrold | G06F 3/0445 |
| 10,921,653 | B2 | * | 2/2021 | Qin | G02F 1/13338 |
| 10,948,751 | B2 | * | 3/2021 | Li | G02F 1/133504 |
| 11,131,884 | B2 | * | 9/2021 | Murzyn | G09G 3/3426 |

(Continued)

FOREIGN PATENT DOCUMENTS

CN     112540474     3/2021

*Primary Examiner* — William Lu
(74) *Attorney, Agent, or Firm* — JCIPRNET (57) ABSTRACT

A display apparatus having a privacy mode and a sharing mode is provided. The display apparatus includes a display panel, a privacy liquid crystal module, and a touch sensing module. The touch sensing module is disposed on a side of the privacy liquid crystal module and is configured to generate a touch signal. When the display apparatus is in the privacy mode, the privacy liquid crystal module is applied with a first voltage. When the display apparatus is in the sharing mode and the touch sensing module generates the touch signal, the privacy liquid crystal module is applied with a second voltage for a predetermined time. After maintaining for the predetermined time, a third voltage is applied to the privacy liquid crystal module. The display apparatus can effectively reduce a smear phenomenon caused by the display apparatus being touched in a sharing mode.

10 Claims, 5 Drawing Sheets

(56) References Cited

U.S. PATENT DOCUMENTS

| | | | |
|---|---|---|---|
| 11,947,210 B1* | 4/2024 | Large | G06T 7/246 |
| 12,050,373 B2* | 7/2024 | Hsieh | G02B 5/0242 |
| 12,085,819 B1* | 9/2024 | Wen | G02F 1/13306 |
| 2004/0141107 A1* | 7/2004 | Jones | G09G 3/3651 |
| | | | 349/77 |
| 2004/0189612 A1* | 9/2004 | Bottari | G02F 1/1323 |
| | | | 345/173 |
| 2005/0286000 A1* | 12/2005 | Tsai | G02F 1/1393 |
| | | | 349/96 |
| 2006/0054858 A1* | 3/2006 | Francis | C09K 19/46 |
| | | | 252/299.63 |
| 2012/0280895 A1* | 11/2012 | Yeh | G02F 1/133371 |
| | | | 345/87 |
| 2016/0357046 A1* | 12/2016 | Choi | G02F 1/1336 |
| 2018/0321523 A1* | 11/2018 | Robinson | G02F 1/13363 |
| 2019/0227366 A1* | 7/2019 | Harrold | G06F 3/0412 |
| 2019/0353944 A1* | 11/2019 | Acreman | G02F 1/137 |
| 2020/0004061 A1* | 1/2020 | Woodgate | G02F 1/133504 |
| 2020/0400979 A1* | 12/2020 | Chen | G02F 1/133536 |
| 2021/0033898 A1* | 2/2021 | Woodgate | G02F 1/137 |
| 2021/0149234 A1* | 5/2021 | Woodgate | G02F 1/133738 |
| 2021/0149511 A1* | 5/2021 | Chung | G06F 3/0416 |
| 2021/0341798 A1* | 11/2021 | Woodgate | G02B 30/31 |
| 2022/0229320 A1* | 7/2022 | Dong | G02F 1/134309 |
| 2023/0125386 A1* | 4/2023 | Jitsui | G02F 1/133541 |
| | | | 349/18 |
| 2023/0129697 A1* | 4/2023 | Murata | G02F 1/133749 |
| | | | 349/56 |
| 2023/0236448 A1* | 7/2023 | Murata | G02F 1/134363 |
| | | | 349/33 |
| 2023/0324729 A1* | 10/2023 | Woodgate | G02F 1/0136 |

* cited by examiner

DISPLAY APPARATUS

CROSS-REFERENCE TO RELATED APPLICATION

This application claims the priority benefit of China application serial no. 202223270554.2, filed on Dec. 7, 2022. The entirety of the above-mentioned patent application is hereby incorporated by reference herein and made a part of this specification.

BACKGROUND

Technical Field

The disclosure relates to an optical apparatus, and in particular to a display apparatus.

Description of Related Art

The privacy display is to provide an electric field to control the arrangement of liquid crystal molecules and modulate light differently, thereby achieving the privacy effect. In order to further improve the privacy effect of the current structure, a liquid crystal privacy panel with a touch sensor is placed on a display panel, so that the sharing mode and the privacy mode both have a better visual experience.

When the user intends to use the touch function of the panel, the finger first touches the privacy panel with the touch sensor. However, when the privacy panel is in the sharing mode, since the liquid crystals in the panel are not applied with an electric field, an external force (finger) causes the arrangement of the liquid crystals to be deformed and the restoration is slow. Due to the unexpected deflection of display light rays passing through the areas, the position and the trajectory of the finger after the touch will show a smear phenomenon, and the smear will be observed by the user.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a display apparatus, which can effectively reduce a smear phenomenon caused by the display apparatus being touched in a sharing mode.

Other objectives and advantages of the disclosure may be further understood from the disclosed technical features of the disclosure.

In order to achieve one, a part, or all of the above objectives or other objectives, an embodiment of the disclosure provides a display apparatus having a privacy mode and a sharing mode. The display apparatus includes a display panel, a privacy liquid crystal module, and a touch sensing module. The display panel is configured to provide an image beam. The privacy liquid crystal module is disposed on a transmission path of the image beam. The privacy liquid crystal module is voltage-controlled to switch the display apparatus between the privacy mode and the sharing mode. The touch sensing module is disposed on a side of the privacy liquid crystal module and is configured to generate a touch signal. When the display apparatus is in the privacy mode, the privacy liquid crystal module is applied with a first voltage. When the display apparatus is in the sharing mode and the touch sensing module generates the touch signal, the privacy liquid crystal module is applied with a second voltage for a predetermined time, and after the privacy liquid crystal module is applied with the second voltage for the predetermined time, the privacy liquid crystal module is applied with a third voltage, and the third voltage is less than the second voltage.

In order to achieve one, a part, or all of the above objectives or other objectives, an embodiment of the disclosure provides a display apparatus having a privacy mode and a sharing mode. The display apparatus includes a display panel, a privacy liquid crystal module, and a touch sensing module. The display panel is configured to provide an image beam. The privacy liquid crystal module is disposed on a transmission path of the image beam. The privacy liquid crystal module is voltage-controlled to switch the display apparatus between the privacy mode and the sharing mode. The touch sensing module is disposed on a side of the privacy liquid crystal module and is configured to generate a touch signal. When the display apparatus is in the sharing mode, a control voltage applied to the privacy liquid crystal module is changed according to the touch signal.

Based on the above, in an embodiment of the disclosure, when the display apparatus is in the sharing mode and the touch sensing module generates the touch signal, the privacy liquid crystal module is applied with the second voltage for the predetermined time, so that the speed of restoration of arrangement of liquid crystals of the privacy liquid crystal module is faster, thereby improving the smear phenomenon after the display apparatus is pressed.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top", "bottom", "front", "back", etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
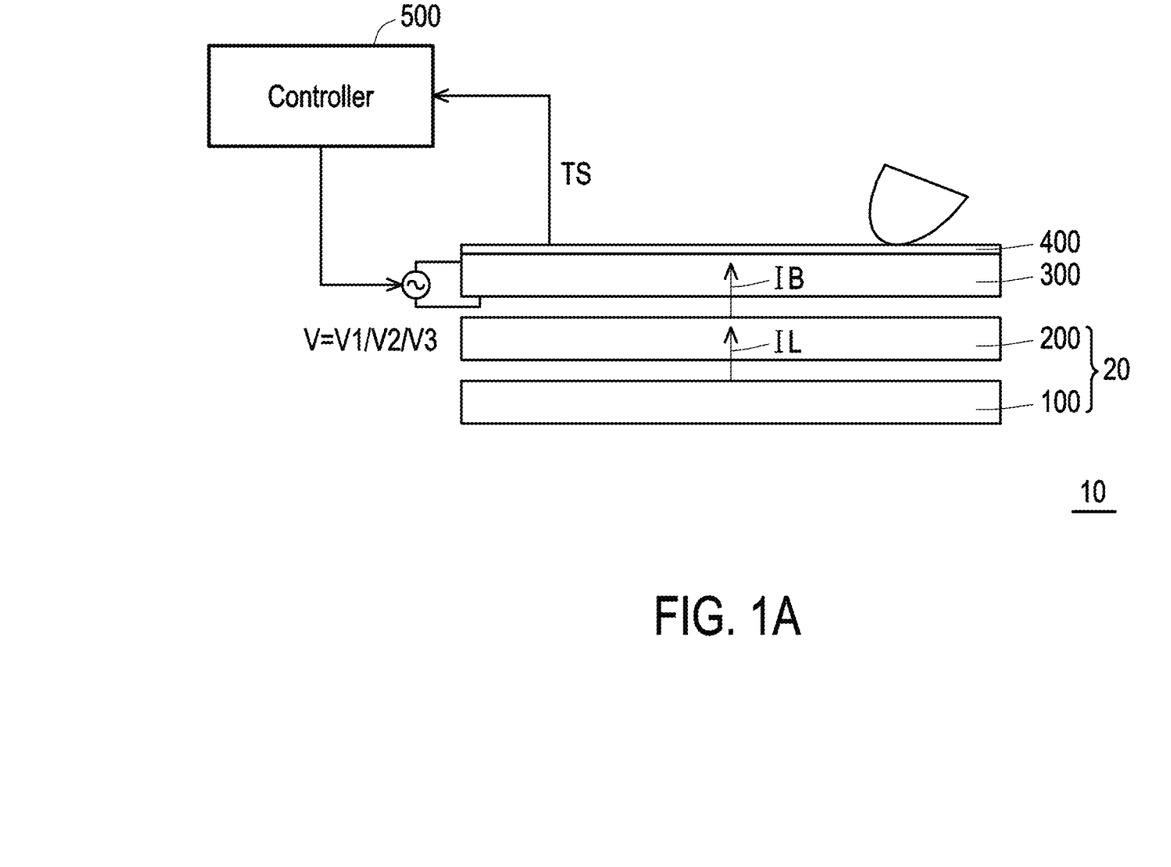
FIG. 1A is a schematic diagram of a display apparatus according to an embodiment of the disclosure.
Figure 1B:
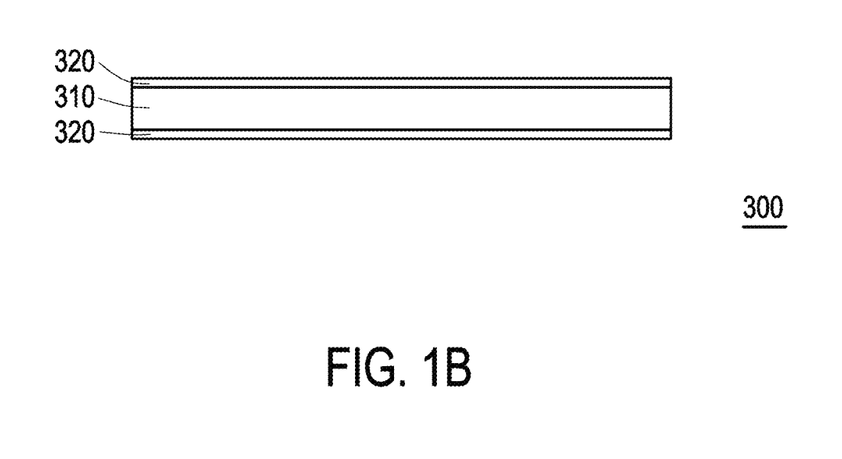
FIG. 1B is a schematic diagram of a privacy liquid crystal module of FIG. 1A.

FIG. 1A is a schematic diagram of a display apparatus according to an embodiment of the disclosure. FIG. 1B is a schematic diagram of a privacy liquid crystal module of FIG. 1A. Please refer to FIG. 1A and FIG. 1B. An embodiment of the disclosure provides a display apparatus 10 having a privacy mode and a sharing mode. The display apparatus 10 includes a display panel 20, a privacy liquid crystal module 300, and a touch sensing module 400. The display panel 20 is configured to provide an image beam IB. In the embodiment, the display panel 20 includes a backlight source 100 and a display liquid crystal module 200. In other embodiments, the display panel is, for example, a self-luminous display panel.

In the embodiment, the backlight source 100 of the display panel 20 is configured to provide an illumination beam IL. The backlight source 100 may be a light source composed of multiple arrayed light emitting diodes (LEDs), mini LEDs, or micro LEDs. In other embodiments, the backlight source 100 may be an edge-type backlight.

In the embodiment, the display liquid crystal module 200 of the display panel 20 is disposed on a transmission path of the illumination beam IL and converts the illumination beam IL into the image beam IB. The display liquid crystal module 200 is, for example, a thin film transistor liquid crystal display (TFT-LCD). The display liquid crystal module 200 may include a liquid crystal layer and electrode layers. The electrode layers are composed of multiple pixel electrodes independent of each other and is configured to independently control the light emission intensity of light rays passing through each pixel of the display liquid crystal module 200.

In the embodiment, the privacy liquid crystal module 300 is voltage-controlled to switch the display apparatus 10 between the privacy mode and the sharing mode. The privacy liquid crystal module 300 is disposed on the display panel 20, and the privacy liquid crystal module 300 is disposed on the transmission path of the image beam IB. In the embodiment, the display liquid crystal module 200 is disposed between the backlight source 100 and the privacy liquid crystal module 300. A liquid crystal mode of the privacy liquid crystal module 300 may be electrically controlled birefringence (ECB) or vertical alignment (VA), but the disclosure is not limited thereto. As shown in FIG. 1B, the privacy liquid crystal module 300 includes a liquid crystal layer 310 and two electrode layers 320. The liquid crystal layer 310 is disposed between the two electrode layers 320. The electrode layer 320 is a full-surface electrode layer. In other words, when uniformly distributed beams pass through the privacy liquid crystal module 300, the light emission intensities (at the same emission angle) of the beams at various positions of the privacy liquid crystal module 300 are approximately the same.

In the embodiment, the touch sensing module 400 is disposed on a side of the privacy liquid crystal module 300 and is configured to generate a touch signal TS. The touch signal TS is, for example, a signal generated by the touch sensing module 400 in response to whether a user (for example, a finger or a stylus) touches a touch detection area of the display apparatus 10. For example, the touch signal TS is not output or the touch signal TS of "0" is output when a touch action of the user is not detected. For example, the touch signal TS of "1" is output when the touch action of the user is detected. When the display apparatus 10 of the disclosure is in the sharing mode, a control voltage applied to the privacy liquid crystal module 300 may be changed according to the touch signal TS (for example, whether the touch signal TS is received or an output content of the touch signal TS). The details are as follows.

Figure 2:
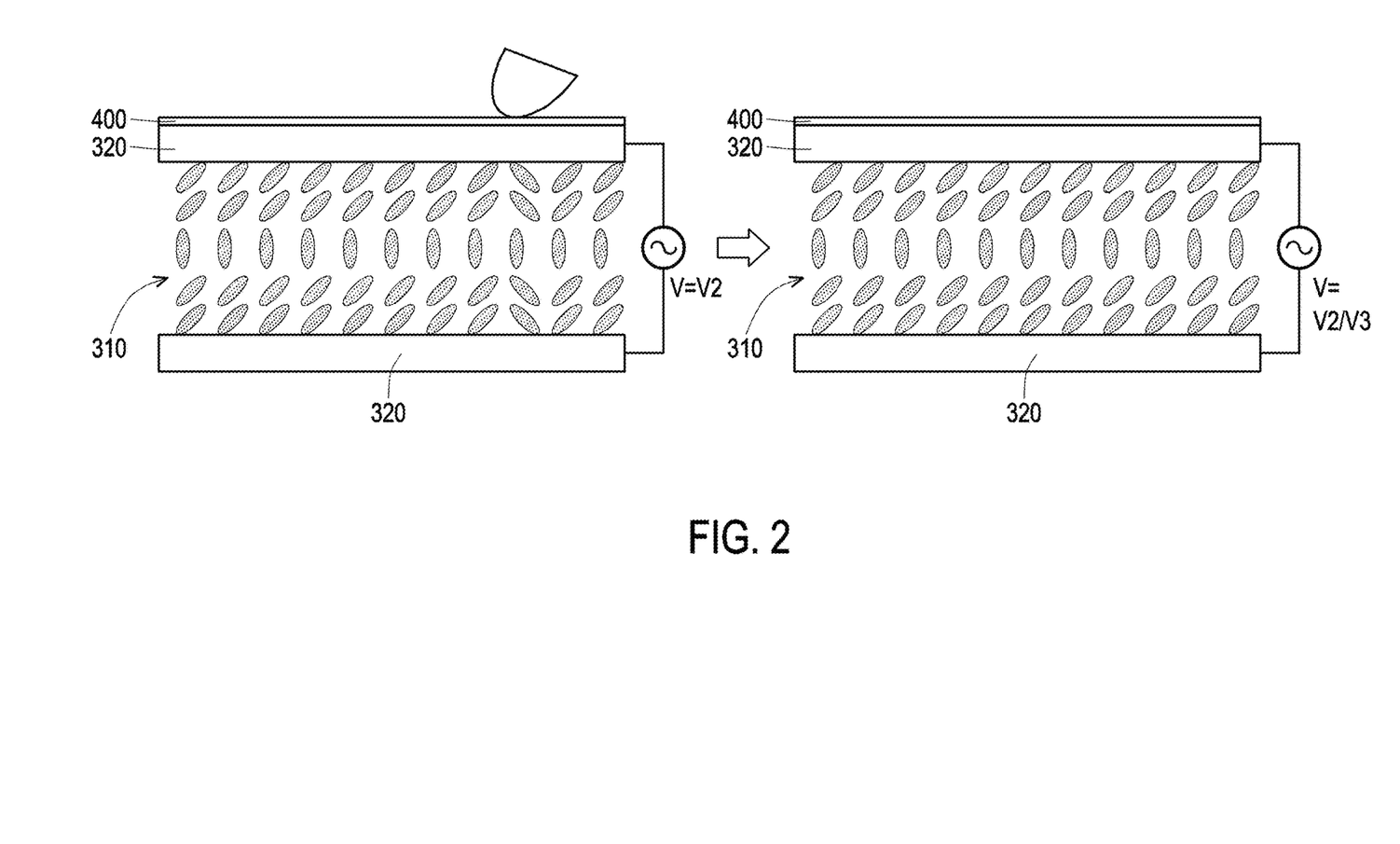
FIG. 2 is a schematic diagram of applying a second voltage to a privacy liquid crystal module of a display apparatus according to an embodiment of the disclosure.

In the embodiment, when the display apparatus 10 is in the privacy mode, a control voltage V applied to the privacy liquid crystal module 300 is a first voltage V1. The control voltage V applied to the privacy liquid crystal module 300 may be defined as a voltage difference between the two electrode layers 320 of the privacy liquid crystal module 300. FIG. 2 is a schematic diagram of applying a second voltage to a privacy liquid crystal module of a display apparatus according to an embodiment of the disclosure. Please refer to FIG. 1A and FIG. 2 at the same time. When the display apparatus 10 is in the sharing mode and the touch sensing module 400 generates the touch signal TS (for example, when the touch signal TS is received or the touch signal TS is changed), the control voltage V applied to the privacy liquid crystal module 300 is a second voltage V2, which is maintained for a predetermined time. In addition, when in the sharing mode and the touch sensing module 400 is not touched or after the predetermined time, the control voltage V applied to the privacy liquid crystal module 300 is 0 or the applied control voltage V is less than the second voltage V2 and greater than 0.

For example, taking FIG. 2 as an example, when the touch sensing module 400 is touched, the liquid crystal layer 310 of the privacy liquid crystal module 300 under a position where the touch sensing module 400 is touched is squeezed by an external force such that the arrangement of liquid crystals is deformed, as shown on the left of FIG. 2. At this time, in the sharing mode, the second voltage V2 is applied to the privacy liquid crystal module 300. Therefore, after the event of the touch sensing module 400 being touched ends, the liquid crystal layer 310 may immediately (quickly) restore the original arrangement, as shown on the right of FIG. 2.

In the embodiment, within the predetermined time after applying the second voltage V2, if the touch sensing module 400 generates another touch signal TS (that is, when the user performs a touch operation), the second voltage V2 is continuously applied to the privacy liquid crystal module 300 for the predetermined time according to a generation time point of another touch signal TS. In other words, as long as the touch sensing module 400 generates a new touch signal TS within the predetermined time, the action of the privacy liquid crystal module 300 being continuously applied with the second voltage V2 for the predetermined time will rerun.

In the embodiment, after the privacy liquid crystal module 300 is applied with the second voltage V2 for the predetermined time (that is, when the predetermined time is exceeded), the control voltage V applied to the privacy liquid crystal module 300 is a third voltage V3, and the third voltage V3 is less than the second voltage V2. In an embodiment, the third voltage V3=0 volts or the privacy liquid crystal module 300 is not applied with the control voltage V.

In the embodiment, during the remaining time except the predetermined time of the sharing mode, the privacy liquid crystal module 300 is applied with the third voltage V3, and the third voltage V3 is less than the second voltage V2. In an embodiment, the third voltage V3=0 volts or the privacy liquid crystal module 300 is not applied with the control voltage V.

In an embodiment, a ratio of the second voltage V2 to the first voltage V1 (V2/V1) is in a range of 0.4 to 0.6. For example, the first voltage V1 is 2.76 V, and the second voltage V2 is in a range of 1.3 V to 1.5 V. The predetermined time is greater than 0 and less than or equal to 5 seconds. A light emission viewing angle range of the privacy liquid crystal module 300 applied with the first voltage V1 is less than a light emission viewing angle range of the privacy liquid crystal module 300 applied with the second voltage V2.

In another embodiment, the ratio of the second voltage V2 to the first voltage V1 (V2/V1) is greater than 1.5, is greater than 2, or is in a range of 2 to 7.5. For example, the first voltage V1 is 2.76 V, and the second voltage V2 is greater than 5 V. The predetermined time is greater than 0 and less than or equal to 5 seconds. The light emission viewing angle range of the privacy liquid crystal module 300 applied with the first voltage V1 is greater than the light emission viewing angle range of the privacy liquid crystal module 300 applied with the second voltage V2.

In the embodiment, the display apparatus 10 further includes a controller 500. The controller 500 is electrically connected to the privacy liquid crystal module 300 and the touch sensing module 400, and is configured to control a voltage value that should be applied to the privacy liquid crystal module 300. For example, when the display apparatus 10 is in the sharing mode and the touch sensing module 400 is touched to generate the touch signal TS, the controller 500 receives the touch signal TS and controls other circuits (for example, a voltage control apparatus) such that the liquid crystal module 300 is applied with the second voltage V2 for the predetermined time. In other embodiments, the controller 500 may directly output the second voltage V2 to the privacy liquid crystal module 300.

In the embodiment, the controller 500 includes, for example, a microcontroller unit (MCU), a central processing unit (CPU), a microprocessor, a digital signal processor (DSP), a programmable controller, a programmable logic device (PLD), other similar apparatuses, or a combination of the apparatuses, and the disclosure is not limited thereto. In addition, in an embodiment, each function of the controller 500 may be implemented as multiple program codes. The program codes are stored in a memory and executed by the controller 500. Alternatively, in an embodiment, each function of the controller 500 may be implemented as one or more circuits. The disclosure does not limit the implementation of each function of the controller 500 by means of software or hardware.

Figure 3:
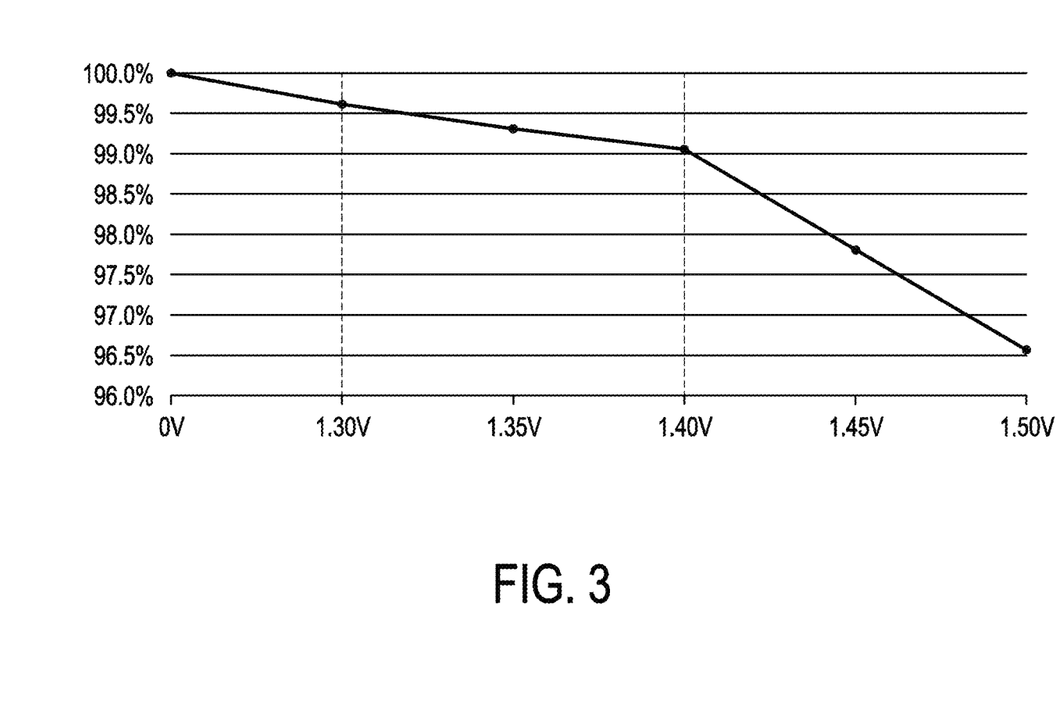
FIG. 3 is a graph of normalized light emission brightness of a liquid crystal module with a horizontal slope of 45 degrees relative to voltage within a voltage range when a second voltage is applied to a privacy liquid crystal module of a display apparatus according to an embodiment of the disclosure.

FIG. 3 is a graph of normalized light emission brightness of a liquid crystal module with a viewing angle of 45 degrees relative to voltage within a voltage range when a second voltage is applied to a privacy liquid crystal module of a display apparatus according to an embodiment of the disclosure. In the disclosure, the greater the voltage (for example, the second voltage V2) applied to the privacy liquid crystal module, the faster the speed of restoration of arrangement of the liquid crystals of the privacy liquid crystal module 300, and the better the effect of improving smear after the display apparatus 10 is pressed. For example, in the privacy liquid crystal module 300, after applying the second voltage V2 greater than 1.3 V, the smear phenomenon begins to be significantly improved. For example, after applying the second voltage V2 greater than 1.4 V, the smear phenomenon is significantly improved. Moreover, as shown in FIG. 3, when the privacy liquid crystal module 300 is applied with the second voltage V2 is in the range of 1.3 V to 1.5 V, the normalized light emission brightness of the privacy liquid crystal module 300 with viewing angle of 45 degrees still maintains 96.5% to 99.5% efficacy. In particular, in the case where the applied voltage is greater than 1.5 V to less than 2.76 V, the smear phenomenon is still significantly improved, but the light emission brightness is affected to a greater extent.

Figure 4:
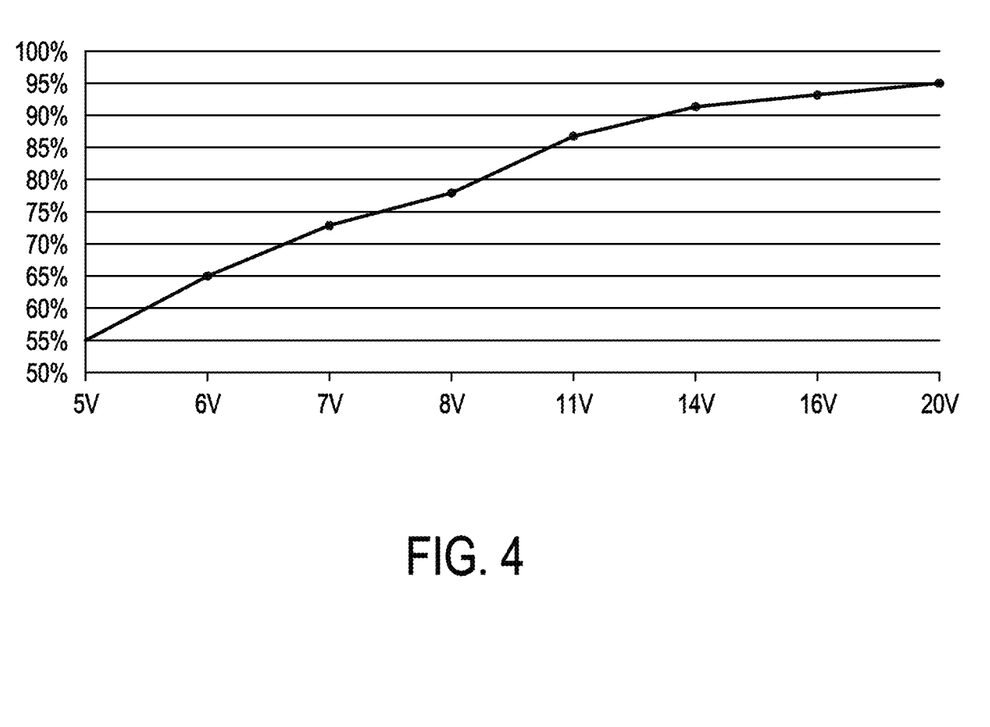
FIG. 4 is a graph of normalized light emission brightness of a liquid crystal module with a horizontal slope of 45 degrees relative to voltage within another voltage range when a second voltage is applied to a privacy liquid crystal module of a display apparatus according to an embodiment of the disclosure.

FIG. 4 is a graph of normalized light emission brightness of a liquid crystal module with a viewing angle of 45 degrees relative to voltage within another voltage range when a second voltage is applied to a privacy liquid crystal module of a display apparatus according to an embodiment of the disclosure. In FIG. 4, the voltage range is 5 V to 20 V. The greater the second voltage V2, the faster the speed of restoration of arrangement of the liquid crystals of the liquid crystal module 300, and the better the effect of improving smear after the display apparatus 10 is pressed. Moreover, the voltage range of FIG. 4 is greater than the voltage range of FIG. 3, so in FIG. 4, the effect of improving smear after the display apparatus 10 is pressed is better. Moreover, as shown in FIG. 4, when the privacy liquid crystal module 300 is applied with the second voltage V2 of 5 V, the normalized light emission brightness of the privacy liquid crystal module 300 with the viewing angle of 45 degrees only has 55% efficacy. When the privacy liquid crystal module 300 is applied with the second voltage V2 of 20 V, the normalized light emission brightness of the privacy liquid crystal module 300 with the viewing angle of 45 degrees has 95% efficacy.

In summary, in an embodiment of the disclosure, the display apparatus includes the backlight, the display liquid crystal module, the privacy liquid crystal module, and the touch sensing module. When the display apparatus is in the sharing mode and the touch sensing module generates the touch signal, the privacy liquid crystal module is applied with the second voltage for the predetermined time, so that the speed of restoration of arrangement of liquid crystals of the privacy liquid crystal module is faster, thereby improving the smear phenomenon after the display apparatus is pressed.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, having a privacy mode and a sharing mode, comprising:
    a display panel, configured to provide an image beam;
    a privacy liquid crystal module, voltage-controlled to switch the display apparatus between the privacy mode and the sharing mode, wherein the privacy liquid crystal module is disposed on the display panel, and the privacy liquid crystal module is disposed on a transmission path of the image beam; and
    a touch sensing module, disposed on a side of the privacy liquid crystal module and configured to generate a touch signal, wherein
    when the display apparatus is in the privacy mode, the privacy liquid crystal module is applied with a first voltage;
    when the display apparatus is in the sharing mode, the privacy liquid crystal module is applied with a second voltage or a third voltage;
    when the display apparatus is in the sharing mode and the touch sensing module generates the touch signal, the display apparatus is maintained in the sharing mode and the privacy liquid crystal module is applied with the second voltage for a predetermined time, after the privacy liquid crystal module is applied with the second voltage for the predetermined time, the privacy liquid crystal module is applied with the third voltage, and the third voltage is less than the second voltage, and the third voltage is less than the first voltage.

2. The display apparatus according to claim 1, wherein a ratio of the second voltage to the first voltage is in a range of 0.4 to 0.6.

3. The display apparatus according to claim 2, wherein a light emission viewing angle range of a beam passing through the privacy liquid crystal module applied with the first voltage is less than a light emission viewing angle range of the privacy liquid crystal module applied with the second voltage.

4. The display apparatus according to claim 1, wherein a ratio of the second voltage to the first voltage is greater than 2.

5. The display apparatus according to claim 1, wherein within the predetermined time, when the touch sensing module generates another touch signal, the second voltage is applied to the privacy liquid crystal module for the predetermined time again according to a generation time point of the another touch signal.

6. The display apparatus according to claim 2, wherein the predetermined time is greater than 0 and less than or equal to 5 seconds.

7. The display apparatus according to claim 4, wherein the predetermined time is greater than 0 and less than or equal to 5 seconds.

8. The display apparatus according to claim 1, wherein during a remaining time except the predetermined time of the sharing mode, the privacy liquid crystal module is applied with the third voltage.

9. The display apparatus according to claim 1, wherein the privacy liquid crystal module comprises:
    a liquid crystal layer; and
    two electrode layers, wherein each of the electrode layers is a full-surface electrode layer, wherein the liquid crystal layer is disposed between the electrode layers.

10. A display apparatus, having a privacy mode and a sharing mode, comprising:
    a display panel, configured to provide an image beam;
    a privacy liquid crystal module, voltage-controlled to switch the display apparatus between the privacy mode and the sharing mode, wherein the privacy liquid crystal module is disposed on the display panel, and the privacy liquid crystal module is disposed on a transmission path of the image beam; and
    a touch sensing module, disposed on a side of the privacy liquid crystal module and configured to generate a touch signal, wherein when the display apparatus is in the sharing mode, a control voltage applied to the privacy liquid crystal module is changed according to the touch signal;

wherein when the display apparatus is in the privacy mode, the privacy liquid crystal module is applied with a first voltage;

when the display apparatus is in the sharing mode, the control voltage is a second voltage or a third voltage;

when the display apparatus is in the sharing mode and the touch sensing module generates the touch signal, the display apparatus is maintained in the sharing mode and the privacy liquid crystal module is applied with the second voltage for a predetermined time, after the privacy liquid crystal module is applied with the second voltage for the predetermined time, the privacy liquid crystal module is applied with the third voltage, and the third voltage is less than the second voltage, and the third voltage is less than the first voltage.

* * * * *